E. L. & R. M. MILLS.
MILKING MACHINE.
APPLICATION FILED SEPT. 18, 1914.
1,132,599.
Patented Mar. 23, 1915.
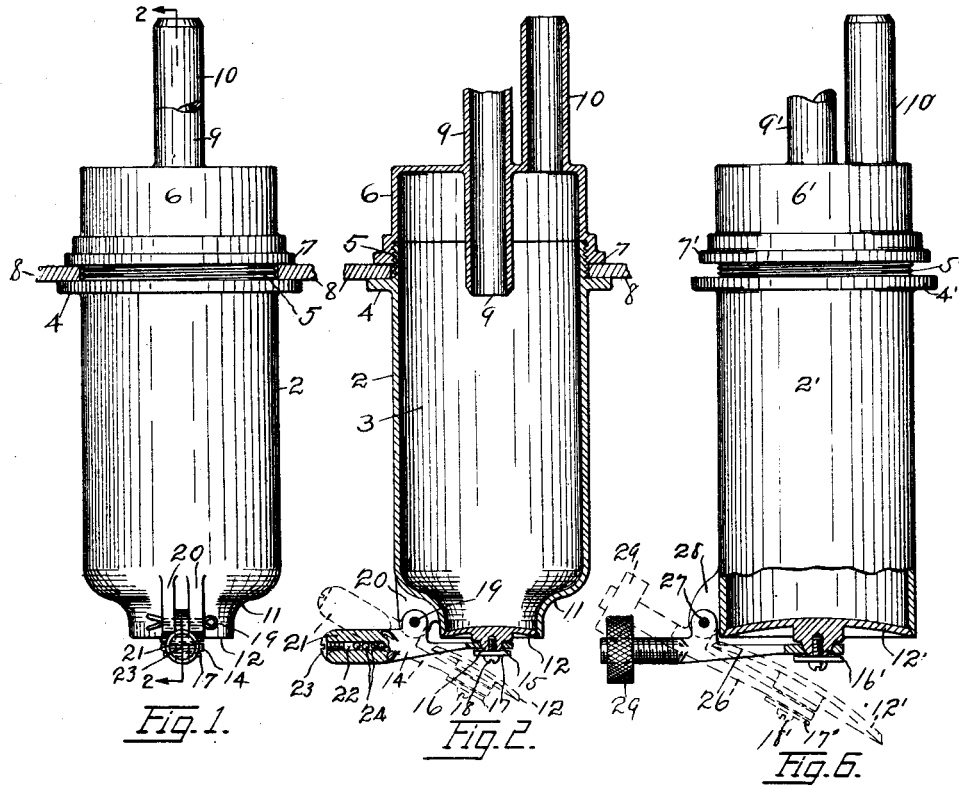
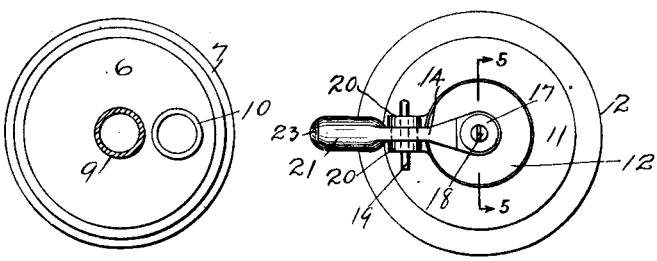
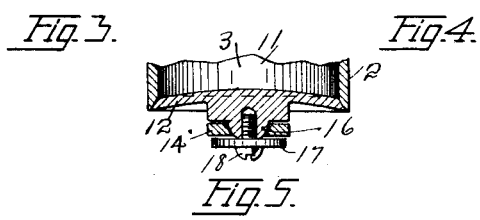
WITNESSES:
Francis P. Delaney.
Ethel M. Schilly
INVENTORS
ERNEST L. MILLS.
RICHARD M. MILLS.
BY Harry D. Wallace.
ATTORNEY.

UNITED STATES PATENT OFFICE.

ERNEST L. MILLS, OF WATERTOWN, AND RICHARD M. MILLS, OF CICERO, NEW YORK.

MILKING-MACHINE.

1,132,599.   Specification of Letters Patent.   Patented Mar. 23, 1915.

Application filed September 18, 1914. Serial No. 862,316.

*To all whom it may concern:*

Be it known that we, ERNEST L. MILLS and RICHARD M. MILLS, citizens of the United States, residing, respectively, at Watertown, Jefferson county, and at Cicero, in the county of Onondaga, State of New York, have invented certain new and useful Improvements in Milking-Machines, of which the following is a specification.

This invention relates to milking machines, and the invention relates particularly to improvements in the milk-receiving parts which are disposed between the vacuum pump and the milk-pail.

The object of the invention is to provide a milk receptacle for milking machines, which is novel, simple, effective and sanitary, and which may be operated without the loss of the vacuum by which the milking is done.

A further object is to provide a novel arrangement of the milk inlet and vacuum tubes, which entirely prevents any portion of the milk from being drawn into the vacuum pump.

A further object is to provide a novel outlet valve which is controlled by a counterweight and which is constructed with the view to rendering the same automatic, quick-acting and positive. And a further object is to generally simplify and improve milking appliances of the class.

We attain these objects by the means described in the annexed specification, illustrated by the accompanying drawing, and then particularly pointed out in the appended claims.

In the drawing, Figure 1 is an elevational view of the milk receiving device assembled ready for use. Fig. 2 is a central vertical section, taken on line 2—2 of Fig. 1; showing the construction, arrangement and operation of the device. Fig. 3 is a top-plan view. Fig. 4 is a bottom-plan view. Fig. 5 is a detail section, taken on line 5—5 of Fig. 4. Fig. 6 is a view showing a modification of the outlet valve.

The present invention relates to the chambered receptacle, into which the milk is drawn by vacuum and then automatically discharged by gravity from the said receptacle into a suitable milk-pail. The other parts of the milking machine are so well known and understood that it is not deemed necessary to illustrate or describe the same.

In the drawing, 2 represents a cylindrical body, the interior 3 of which comprises the milk chamber. Near its upper-end, the said body is provided with an annular flange 4, and above the said flange the cylinder is threaded, as at 5.

6 represents a hollow cap which surmounts the cylinder 2, the bottom of said cap being internally threaded for attachment to the threaded portion 5 of the cylinder 2, and 7 represents an annular flange similar to the flange 4. The flanges 4 and 7 are intended to grip the top, as 8, of a milk-pail (not shown) for supporting the milk chamber.

The inlet for the milk comprises a tube 9 which preferably pierces the center of the top of the cap 6 and is disposed substantially axially. This tube may be integral with the cap, as shown, or it may be a separate part suitably secured to the cap. The tube 9 preferably projects downwardly a considerable distance into the top portion of the cylinder 2, so as to discharge the milk at a suitable distance from the top of the cap. The upper end of the tube 9 may connect in any suitable manner with the teat-cups (not shown).

10 represents the air or vacuum tube which just pierces the top of the cap and then extends upwardly therefrom. The tube 10 may also be integral with the cap, as shown, if desired. The tube 10 may connect in any suitable manner with a vacuum pump (not shown). The lower end of tube 10 of the present device preferably terminates at the underside of the cap and is not intended to project into the said cap. Under this construction and arrangement of the tubes 9 and 10 the suction occurs at the extreme top of the cap, while the milk is admitted at a point considerably below the lower end of the vacuum tube 10. By this arrangement of the said tubes, there is no danger of any of the milk spray or vapor being drawn into the tube 10 or into the vacuum pump and fouling, injuring or interfering with the working of said pump.

Figs. 1, 2, 4 and 5 illustrate the preferred form of the invention, in which the lower end of the body 2 is contracted, as at 11, the area of the bottom 11 being preferably one-half that of the area of the body 2 above the said contraction. The outlet valve consists of a disk 12, which is preferably concavo-convex, and arranged with its convex surface facing upwardly so as to allow the milk to readily drain from the body 2 when the said valve opens, as shown by dotted lines in Fig. 2. Disk 12 has its circumferential edge beveled to approximately 45 degrees, which is received into a similarly beveled or mitered seat or mouth of the part 11. By this construction and arrangement of the valve 12, the said valve may be readily ground to a perfect seating, so as to prevent leakage of the air or liquid. The valve 12 is pivotally supported, so as to freely revolve for rendering the same self-seating, by a lever 14, the said lever having a perforation 15 to receive a ball-like boss 16 which may be integral with the bottom of the disk 12. These parts are held in operative position by a washer 17 and a screw 18, the latter piercing the washer and being threaded into the ball 16. The joint between the lever 14 and the ball 16 and washer 17 is loose, as shown in Figs. 2 and 5, which allows the valve 12 to float and adjust itself to its seat 13 without danger of binding or canting. The lever 14 is pivoted by a pin 19, between lugs 20, carried by the neck 11 of the body 2, and the said lever has an extension 21 which acts as a counter-weight for normally holding the clapper valve 12 in its seat. The counter-weight portion 21 is preferably chambered, as at 22, the said chamber being closed by a screw 23, and in order to increase or decrease the counter-weight, shot or other small parts, as 24, may be inserted in the chamber 22. The full and dotted lines in Fig. 2 show the closed and open position of the outlet valve 12. Valve 12 is normally held in the closed position by the counter-weight 21, and also by the force of the vacuum while the milk is being drawn from the cow's udder, and as soon as the vacuum is broken the weight of the milk in the chamber 3 forces the valve 12 open, and allows the milk to gravitate into the pail. By the provision of the counter-weighted lever 14, the valve 12 is positively closed after each discharge of the milk, and under this construction and arrangement, if the pail or other support happens to be tilted one way or the other to a considerable angle, it does not prevent the counter-weight from closing the valve 12.

Fig. 6 illustrates a modification of the device, which consists principally in providing a plain cylindrical body 2', and a lever 26 which is pivoted by a pin 27 to lugs 28 disposed on the outer wall of the cylinder 2'. The outer end of lever 26 is threaded, and the counter-weight consists of a nut 29 by which the weight is increased or decreased. By making the body 2' the same diameter throughout the valve 12' is larger than the part 12 and the milk has a freer outlet. When properly constructed and ground both of the valves 12 and 12' will effectually seal the outlet ends of the cylinders and there is no danger of any loss of the vacuum during the operation of the machine.

A particular advantage of the comparatively small valve 12 is that, the bearing surface on the seat 13 is relatively small and light, and is therefore less liable to leak, and it is also easier to keep in perfect fitting condition, than if the said parts were larger.

Our invention is extremely simple and practical. The peculiar disposition and arrangement of the tubes 9 and 10, for preventing the milk from being drawn into the pump, together with the contracted bottom which is closed by the relatively small floating counter-weighted outlet valve 12, are the essentially novel and material features of our invention.

It is obvious that some changes or modifications may be made in the parts of the device within the scope defined by appended claims, without departing from the spirit of our invention.

Having thus described our invention what we claim as new and desire to secure by Letters Patent, is—

1. In a milking machine, a cylindrical milk chamber, an air exhaust tube entering one end of said chamber, an inlet tube entering said chamber substantially axially and parallel to the air exhaust tube, adapted to discharge the milk into said chamber below the said air exhaust tube, and a counter-weighted valve in the opposite end of said chamber for controlling the discharge of the milk from the said chamber.

2. A milking machine, including a milk chamber, a screw cap for closing the upper end of said chamber, a milk tube piercing said cap and extending downwardly into the said chamber, a vacuum tube communicating with the interior of said cap, its lower end terminating at the top of said cap, and an outlet valve controlled by a counter-weight for normally closing the bottom of said chamber, said valve adapted to be opened by the weight of the milk in the said chamber whenever the vacuum is destroyed.

3. A milking machine, including a hollow body, having an externally threaded open top and contracted bottom provided with the valve seat, a screw-cap for closing the top of said body, a milk-tube passing through the top of said cap and projecting downwardly into said body, a vacuum-tube piercing the top of said cap but terminating at the inner side of said top, a counter-weighted lever hinged to lugs carried by the contracted portion of said body, and a valve loosely supported by said lever adapted to be normally held in said seat by the counter-weight as well as by the force of the vacuum, said valve adapted to be swung open by the weight of the milk whenever the vacuum is destroyed.

4. In a milking machine, a milk chamber having its upper end closed, an air tube piercing the upper end of the chamber, the lower end of said tube being flush with the inner top side of said chamber, a milk inlet tube also piercing the upper end of said chamber and extending downwardly into said chamber, so as to discharge the milk below the lower end of said air tube, said milk tube disposed parallel to said air tube, a valve for closing the lower end of said chamber, said valve engaging a seat formed in said lower end, and a counterweighted lever for normally holding said valve in its seat when the chamber is empty.

5. A milking machine, including a chambered milk receptacle comprising a cylindrical body open at each end, its upper end threaded, its lower end being contracted and having a valve seat within the contracted portion, a cap screwed on to the upper end of said body, a milk tube piercing the top of said cap and then extending downwardly into the upper end of said body, a vacuum tube piercing the top wall of said cap, its lower end being disposed flush with the inner side of said wall, a valve for closing the contracted bottom of the body, a counterweighted lever for supporting the said valve, said lever normally holding said valve in the closed position while said body is empty and also while the vacuum is effective, said valve adapted to be forced open by the weight of the milk in said body whenever the vacuum is destroyed.

In testimony whereof we affix our signatures in presence of two witnesses.

ERNEST L. MILLS.
RICHARD M. MILLS.

Witnesses:
HARRY DE WALLACE,
FRANCIS T. DELANEY.

Copies of this patent may be obtained for five cents each, by addressing the "Commissioner of Patents, Washington, D. C."